US011906720B1

(12) United States Patent
Ogien et al.

(10) Patent No.: US 11,906,720 B1
(45) Date of Patent: Feb. 20, 2024

(54) DEVICES FOR EX VIVO MICROSCOPIC ANALYSIS OF SAMPLES AND IN VIVO MICROSCOPIC ANALYSIS OF THE SKIN

(71) Applicant: DAMAE MEDICAL, Paris (FR)

(72) Inventors: Jonas Ogien, Paris (FR); Olivier Levecq, Paris (FR); Alexis Sourp, Courbevoie (FR)

(73) Assignee: DAMAE MEDICAL, Paris (FR)

( * ) Notice: Subject to any disclaimer, the term of this patent is extended or adjusted under 35 U.S.C. 154(b) by 0 days.

(21) Appl. No.: 18/263,255

(22) PCT Filed: Jan. 18, 2022

(86) PCT No.: PCT/EP2022/051027
§ 371 (c)(1),
(2) Date: Jul. 27, 2023

(87) PCT Pub. No.: WO2022/161816
PCT Pub. Date: Aug. 4, 2022

(30) Foreign Application Priority Data

Jan. 29, 2021 (FR) .................................... 2100899

(51) Int. Cl.
*G02B 21/00* (2006.01)
*G02B 21/24* (2006.01)
(Continued)

(52) U.S. Cl.
CPC ....... *G02B 21/0056* (2013.01); *G02B 21/242* (2013.01); *G02B 21/245* (2013.01); *G02B 21/33* (2013.01); *G02B 21/34* (2013.01)

(58) Field of Classification Search
CPC .............. G02B 21/00; G02B 21/0004; G02B 21/0012; G02B 21/0016; G02B 21/0024;
(Continued)

(56) References Cited

U.S. PATENT DOCUMENTS

| 3,202,049 A * | 8/1965 | Bond ..................... G02B 21/24 |
| | | 359/660 |
| 10,514,532 B1 | 12/2019 | Cramb et al. |
| 10,746,978 B2 * | 8/2020 | Brinkman ............. G02B 21/33 |

FOREIGN PATENT DOCUMENTS

| DE | 102009044413 A1 | 5/2010 |
| EP | 3018518 A1 | 5/2016 |

(Continued)

OTHER PUBLICATIONS

International Search Report issued in PCT/EP2022/051027 dated May 11, 2022 (7 pages).
(Continued)

*Primary Examiner* — Thong Q Nguyen
(74) *Attorney, Agent, or Firm* — Osha Bergman Watanabe & Burton LLP

(57) ABSTRACT

The present description relates to a device that includes: a microscope lens with an optical axis; a mounting that includes a distal portion, in which the microscope lens is arranged; a first end piece fixed in a removable manner, in a first operating mode for in vivo microscopic analysis of the skin, to the distal portion of the mounting; a second end piece fixed in a removable manner, in a second operating mode for ex vivo microscopic analysis of a sample, to the distal portion of the mounting; a sample carrier with a receiving surface; a support that cooperates with the second end piece in the second operating mode so as to receive the mounting so that the optical axis of the microscope lens is substantially aligned in a predetermined direction with respect to the receiving surface.

19 Claims, 7 Drawing Sheets

(51) Int. Cl.
  *G02B 21/34* (2006.01)
  *G02B 21/33* (2006.01)
(58) Field of Classification Search
  CPC ............ G02B 21/0028; G02B 21/0052; G02B 21/0056; G02B 21/02; G02B 21/06; G02B 21/24; G02B 21/241; G02B 21/242; G02B 21/245; G02B 21/33; G02B 21/34
  USPC .................................................. 359/368–398
  See application file for complete search history.

(56) References Cited

FOREIGN PATENT DOCUMENTS

| WO | 2015092019 A1 | 6/2015 |
|---|---|---|
| WO | 2016/083003 A1 | 6/2016 |
| WO | 2019138062 A1 | 7/2019 |

OTHER PUBLICATIONS

Written Opinion of the International Searching Authority issued PCT/EP2022/051027 dated May 11, 2022 (10 pages).

International Preliminary Report on Patentability from PCT/EP2022/051027 dated Jul. 31, 2023 (6 pages).

Rajadhyaksha, M. et al.; "In Vivo Confocal Scanning Laser Microscopy of Human Skin II: Advances in Instrumentation and Comparison With Histology"; The Journal of Investigative Dermatology, vol. 113, No. 3, Sep. 1999, pp. 293-303 (11 pages).

König, K. et al.; "High resolution multiphoton tomography of human skin with subcellular spatial resolution and picosecond time resolution"; Journal of Biomedical Optics, vol. 8, No. 2, Jul. 2003, pp. 432-439 (8 pages).

Schmitt, J.M. et al.; "Subsurface Imaging of Living Skin with Optical Coherence Microscopy"; Dermatology, 1995, vol. 191, pp. 93-98 (6 pages).

Chen, Y. et al.; "High-resolution line-scanning optical coherence microscopy"; Optics Letters, vol. 32, No. 14, Jul. 15, 2007, pp. 1971-1973 (3 pages).

Schleusener, J. et al.; "Raman spectroscopy for the discrimination of cancerous and normal skin"; Photonics & Lasers in Medicine, vol. 4, No. 2, 2015, pp. 1-17 (17 pages).

Drakaki, E. et al.; "Spectroscopic methods for the photodiagnosis of nonmelanoma skin cancer"; Journal of Biomedical Optics, vol. 18, No. 6, Jun. 2013, pp. 061221-1-061221-10 (11 pages).

\* cited by examiner

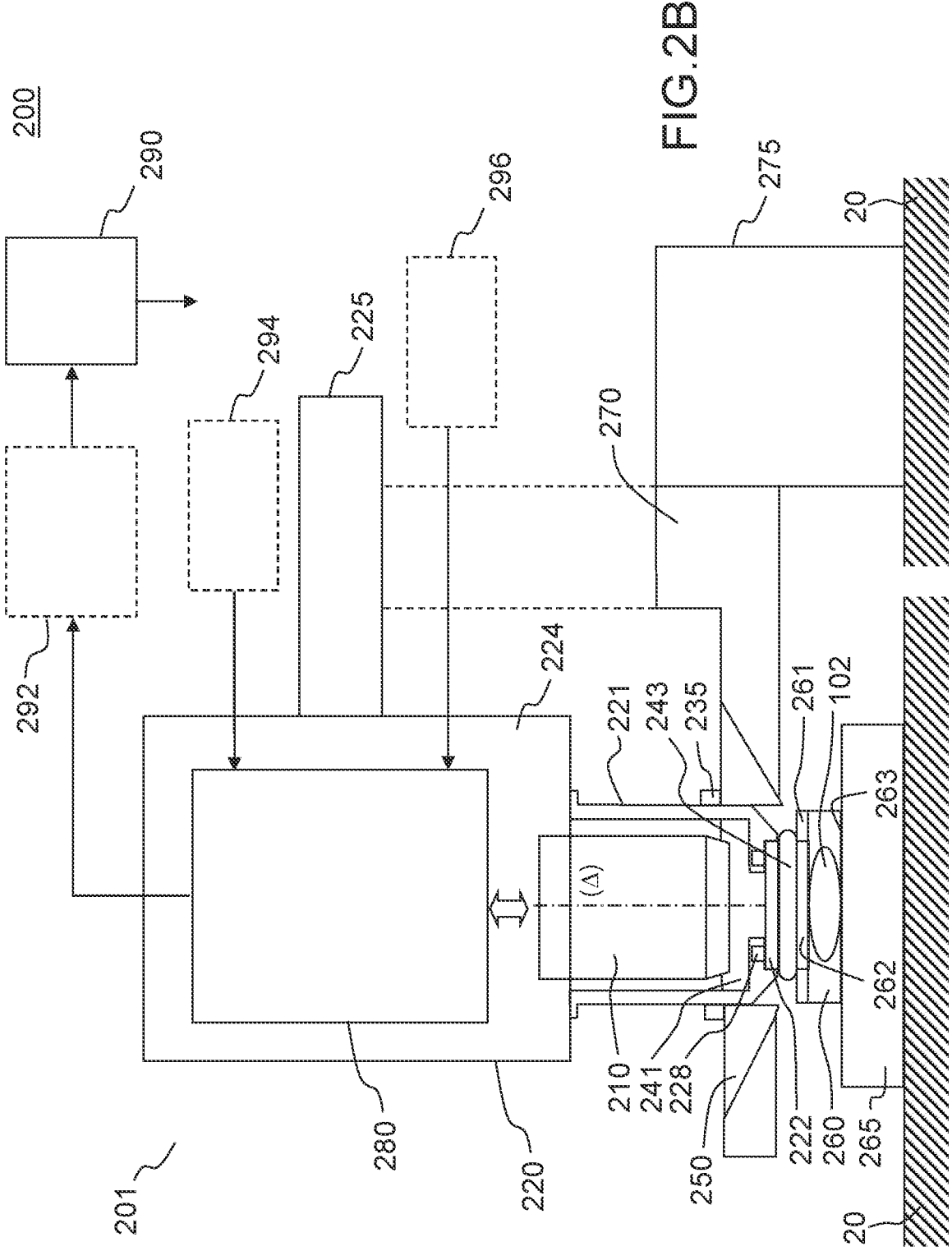

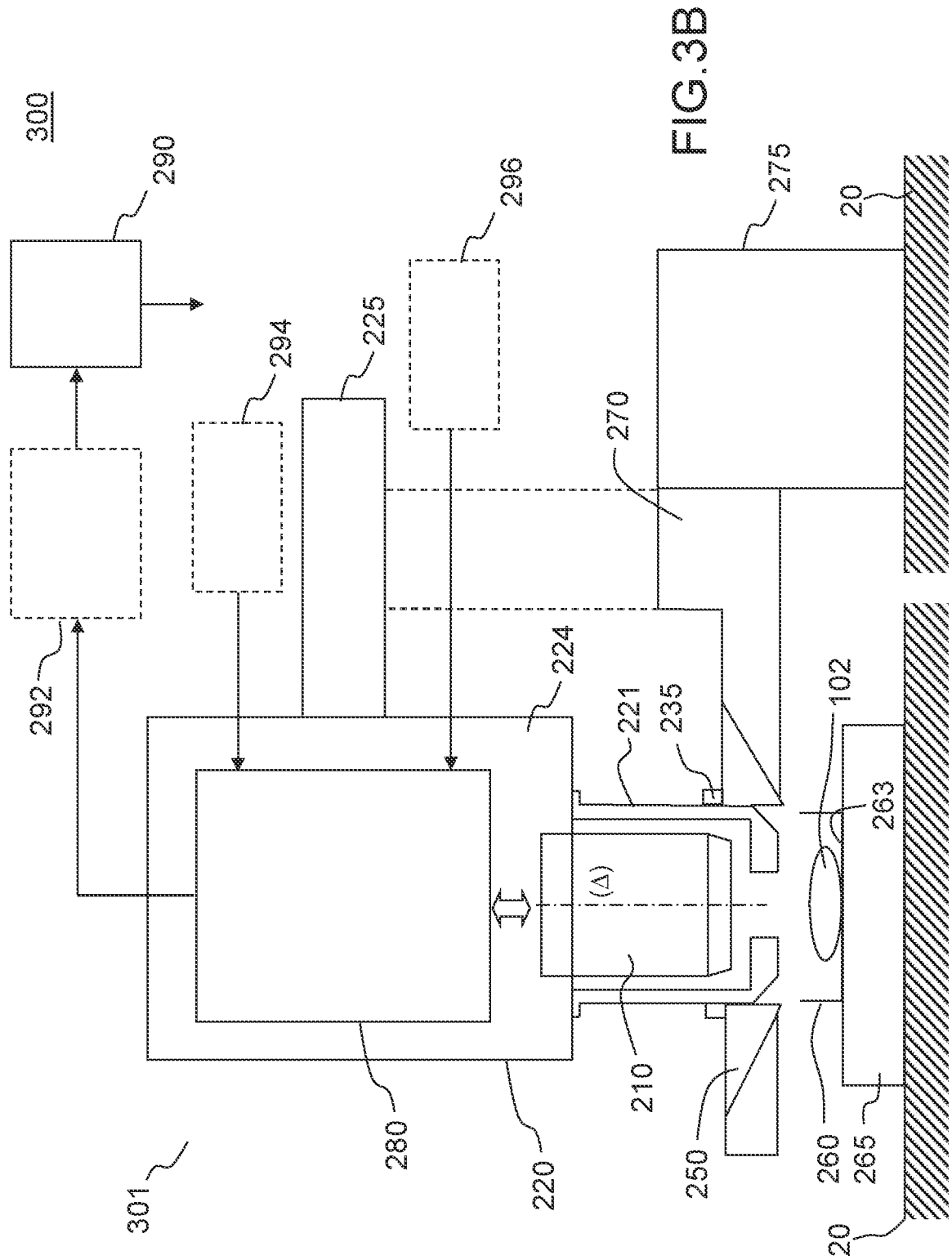

DEVICES FOR EX VIVO MICROSCOPIC ANALYSIS OF SAMPLES AND IN VIVO MICROSCOPIC ANALYSIS OF THE SKIN

TECHNICAL FIELD OF THE INVENTION

The present invention relates to devices for ex vivo microscopic analysis of samples and in vivo microscopic analysis of the skin, microscopic analysis systems which incorporate such devices and ex vivo microscopic analysis methods of samples and in vivo microscopic analysis of the skin using such devices.

PRIOR ART

In the context of a dermatological examination, it is known to carry out a dermoscopic examination, that is to say, an observation of the surface of the skin using a magnifying optical instrument, then a local microscopic analysis in accordance with the observations made in relation to the large-scale image obtained by the dermoscopic examination. The microscopic analysis comprises, for example, microscopic imaging or spectroscopic analysis.

Among the microscopic imaging techniques there are known particularly and in a non-limiting manner confocal microscopic techniques, such as, for example, the technique described in Rajadhyaksha et al. [Ref. 1] or K. König et al. [Ref 2] for non-linear microscopy. There are also known tomographic microscopic techniques by optical coherence (or OCM "Optical Coherence Microscopy"), in the "Time Domain" OCM or in the "Frequency Domain" OCM. Among the OCM techniques, there are known techniques combining optical coherence tomography and confocal microscopy (see, for example, Schmitt et al [Ref. 3]) in order to improve the lateral resolution.

More specifically, the patent application WO2015092019 [Ref. 4] describes a display technique for the internal structure of a semi-transparent object which is arranged in the focal point of a microscope lens, for example, a biological tissue, in order to obtain vertical sections or "B scans" which are orthogonal to the surface of the object, at a high rate (several sections per second), with a high spatial resolution, that is to say, in the order of 1 µm, both axially and laterally, and a satisfactory depth of penetration in the order of a millimeter. This technique is based on optical coherence microscopy but has a linear or one-dimensional confocal filtering configuration (in one direction); to this end, the illuminating line is conjugated optically, particularly by means of the microscope lens, with a linear detector, the detection surface of which has a width which is substantially identical to a width of the image of the line, resulting in a spatial filtering of a region of the object to be observed. Such a technique is thus known by the name of LC-OCT ("Line-field Confocal Optical Coherence Tomography").

The article by Y. Chen et al. [Ref 5] has also proposed a tomographic microscope device using optical coherence with linear scanning, but wherein a sample is displaced in a plane perpendicular to an optical axis of the microscope lens, and in a direction perpendicular to the illuminating line, allowing the formation of projected images of the sample (or "C scans").

Among the spectroscopic analysis techniques for a sample, and in particular a biological tissue such as skin, there are known, for example, and in a non-limiting manner, Raman spectroscopy which allows the formation of a molecular impression of the biological tissue, as described, for example, in Schleusener et al. [Ref 6]. The review article of E. Drakaki et al. [Ref 7] generally sets out different techniques of spectroscopy which is applied to the microscopic analysis of the skin.

All the microscopic analysis techniques described above, whether they are for imaging or for spectroscopy, use an objective lens of a microscope having a large nominal digital aperture, typically greater than or equal to 0.5, for a given viewing range, typically between approximately 0.2 mm and approximately 1.5 mm.

In the context of in particular the microscopic imaging of the skin, the microscope lens can be integrated in a movable manner in a fluid-tight mounting, as described in the application WO2019138062 [Ref 8] in the name of the same applicant and reproduced in FIG. 1.

The fluid-tight mounting 10 particularly comprises a casing 11, a chamber 12 which is filled with an immersion medium, an immersed objective lens 13 which is axially movable in the mounting, and a deformable sealing member 14 which ensures a sealing joint between the immersed objective lens 13 and the casing 11. In the example of FIG. 1, using an immersion medium with a refraction index which is substantially equal to the refraction index of the object being observed advantageously allows a reduction in the optical dispersion deviations, the optical path variations and the introduction of aberrations so that images are obtained with a better resolution. The casing 11 comprises a circumferential portion 15 and a light transmission window 16. The casing 11 further comprises an external portion 17 which is mechanically fixed to the circumferential portion 15. The circumferential portion 15 and the external portion 17 of the casing 11 have, for example, a cylindrical shape in order to receive the movable immersed objective lens 13. The light transmission window 16 is coupled to an end of the circumferential portion 15.

For example, as illustrated in FIG. 1, the end of the circumferential portion 15 has a frustoconical shape, wherein the base with the smallest radius comprises the light transmission window 16. In the mounting illustrated in FIG. 1, the deformable sealing member 14 is configured to become deformed during the displacement of the immersed objective lens 13 relative to the casing 11.

Such a mounting, which is completely sealed even during the axial displacement of the microscope lens in the casing, is thus particularly suitable for an in vivo analysis probe of the skin, which is intended to be handheld by a practitioner in order to be in contact with the skin.

In practice, following the examination of the patient, if the lesion detected in vivo has, for example, a suspicion of cancer, the practitioner will carry out an exeresis, that is to say that he/she will extract the portion of the lesion which he/she has identified as being malignant. Once the exeresis has been carried out, the practitioner must be able to verify that the whole of the tumor has really been removed. To this end, an ex vivo analysis of the sample taken can be carried out.

The probe which is described in [Ref 8] and which incorporates a mounting for the microscope lens as described in FIG. 1 could allow the ex vivo analysis of the sample taken. However, such an analysis is found to be difficult in practice, particularly because of the complexity of displacing the sample relative to the probe in a controlled manner. Other mountings are known in the context of the microscopic analysis of a sample, see, for example, the published patent application EP 3018518 [Ref 9], the published patent application WO 2016/083003 [Ref. 10] and the published patent application DE 10 2009 044 413 [Ref. 11].

The granted U.S. Pat. No. 10,514,532 [Ref. 12] describes a system which is equipped with a confocal microscopic probe which is configured both for ex vivo imaging of samples of tissue taken during an exeresis and in vivo imaging of the skin. More specifically, the confocal microscopic probe comprises a mounting for receiving an microscope lens and a transmission window which is arranged at the end of the mounting. The confocal microscopic probe is mounted on a horizontal arm which is connected to a vertical axle which is supported by a fixed platform in such a manner that the horizontal arm can rotate about the vertical axle, for example, using handles which are arranged on the probe. This arrangement allows, in a first mode, positioning of the probe above the platform in order to allow ex vivo imaging of a sample which is placed on the platform and, in a second mode, rotation of the probe about the vertical axle in order to image a sample outside the platform, for example, the skin of a patient.

However, such a system does not allow the flexibility of a manual probe, which is handheld for in vivo imaging of the skin. Furthermore, it requires adjustment of the alignment of the optical axis of the microscope lens, during the change from the imaging of the skin to the imaging of an ex vivo sample.

The present description proposes devices for ex vivo microscopic analysis of samples and in vivo analysis of the skin, allowing the use of a manual microscopic analysis probe for ex vivo analysis of samples, without any compromise in terms of the ergonomics and without requiring an alignment of the optical axis of the microscope lens during the change from an in vivo operating mode to an ex vivo operating mode.

SUMMARY OF INVENTION

In the present description, the term "comprise" is intended to be understood to mean the same as "include", "contain" and is inclusive or open and does not exclude other elements which are not described or illustrated. Further, in the present description, the term "approximately" or "substantially" is synonymous for (means the same as) a margin less than and/or greater than 10%, for example, 5%, of the respective value.

According to a first aspect, the present description relates to a device which is configured to operate in a first operating mode comprising an in vivo microscopic analysis of the skin and in a second operating mode comprising ex vivo microscopic analysis of a sample, the device comprising:
 a microscope lens comprising an optical axis;
 a mounting comprising a distal portion, in which the microscope lens is arranged, and a proximal portion which is fixedly joined to the distal portion, the distal portion comprising at one end a first transmission window;
 a first end piece which comprises at one end a second transmission window and which is configured to be fixed in a removable manner, in the first operating mode, to the distal portion of the mounting;
 a second end piece which is configured to be fixed in a removable manner, in the second operating mode, to the distal portion of the mounting;
 a sample carrier comprising a receiving surface which is configured to receive a sample in the second operating mode;
 a support which is configured to cooperate with the second end piece in the second operating mode so as to receive the mounting so that the optical axis of the microscope lens is substantially aligned in a predetermined direction with respect to the receiving surface.

The device according to the first aspect allows, by means of an original modular arrangement, an in vivo microscopic analysis of the skin and ex vivo analysis of a sample resulting, for example, from an exeresis, without any compromise regarding the ergonomics in the two operating modes and without requiring an alignment of the optical axis of the microscope lens during the change from an in vivo operating mode to an ex vivo operating mode.

In practice, in the first operating mode, when using the first end piece, the device can form a manual probe for in vivo microscopic analysis. In the second operating mode, when using the second end piece, the device can be received in the support with automatic alignment of the optical axis in a predetermined direction with respect to the receiving surface of the sample carrier, thereby allowing a great ease of use and ensuring repeatability in terms of the manner in which the samples are analyzed.

The predetermined direction is, for example, a direction perpendicular to the receiving surface, in the case particularly of a receiving surface which is substantially planar. In the case of a non-planar receiving surface, a predetermined direction can be, for example, a direction perpendicular to a plane tangential to the receiving surface.

According to one or more exemplary embodiments, the first transmission window comprises a first transparent plate which closes the end of the distal portion of the mounting. The term "transparent plate" is intended to be understood in the sense of the present description to be any plate of a type for transmitting at least a portion of a spectral band which is useful for microscopic analysis. A spectral band which is useful for microscopic analysis comprises at least one detecting spectral band and may further comprise an illuminating spectral band in the case in which an illumination path for the sample comprises the transparent plate. A transparent plate comprises, for example, a glass plate or a plate made of any other transparent material in the spectral band which is useful for microscopic analysis.

Closure of the distal portion of the mounting allows the microscope lens to be protected particularly during the change from one operating mode to another. Closure also allows the use of an immersion medium for operation of the microscope lens with immersion. With a closed transmission window, the fluid-tightness with respect to the microscope lens can be ensured, for example, by means of a sealing device as described in [Ref 12], including during the change from one operating mode to another.

Thus, according to one or more exemplary embodiments, the device further comprises a first immersion medium in contact with the first transparent plate and the microscope lens. A first immersion medium comprises, for example, a liquid or a gel, the refraction index of which is between approximately 1.3 and approximately 1.5, that is to say, a refraction index which is generally similar to the object being studied, skin or sample. The first immersion medium particularly allows, when the microscope lens is configured to move axially in the distal portion of the mounting for analyzing the skin in-depth, the introduction of variation of the optical path and optical aberrations during such a movement to be limited. Using an immersion type microscope lens also allows a limitation on the dispersion deviation between the arms of an interferometer in the case of microscopic analysis comprising an interferometer system.

In other exemplary embodiments, the medium between the first transparent plate and the microscope lens can simply be air.

In other exemplary embodiments, the first transmission window may comprise a simple opening which is formed at the end of the distal portion of the mounting. According to one or more exemplary embodiments, the second transmission window comprises a second transparent plate which closes the end of the first end piece. The second transparent plate comprises, for example, a glass plate or a plate made of any other transparent material in the spectral band which is useful for microscopic analysis.

In the first operating mode comprising in vivo microscopic analysis of the skin and if the first and second transmission windows comprise first and second transparent plates, respectively, the second transparent plate in conjunction with the first transparent plate allows the use of a second immersion medium in contact with the first transparent plate and the second transparent plate.

In this manner, according to one or more exemplary embodiments, the device further comprises a second immersion medium in contact with the first transparent plate and the second transparent plate. A second immersion medium comprises, for example, a liquid or a gel, the refraction index of which is between approximately 1.3 and approximately 1.5, that is to say, a refraction index which is generally similar to the object being studied, skin or sample. A second immersion medium allows the quality of the microscopic analysis to be improved if an immersion type microscope lens is used and the reflections at the interfaces to be limited, such as, for example, the interfaces with the transparent plates. According to one or more exemplary embodiments, the second immersion medium is identical to the first immersion medium.

According to one or more exemplary embodiments, the second immersion medium is different from the first immersion medium and has mechanical, chemical and/or physical characteristics which are different from the first immersion medium. In particular, the second immersion medium may have a second refraction index which is substantially identical to the first refraction index of the first immersion medium or may have a different refraction index. Using a second immersion medium which is different from the first immersion medium allows, for example, the selection of a second immersion medium which facilitates the change from one operating mode to the other when the first immersion medium has characteristics which make it complicated to be manipulated.

Alternatively, the second transmission window may comprise a simple opening which is formed at the end of the first end piece.

According to one or more exemplary embodiments, the sample carrier comprises a receptacle with a third transmission window. For example, the third transmission window comprises a third transparent plate which closes the sample carrier.

Such a transparent plate for closing the sample carrier allows the sample to be pressed in the sample carrier, thereby allowing better repeatability of the microscopic analysis. On the other hand, in the second operating mode comprising the ex vivo microscopic analysis of a sample, the third transparent plate in conjunction with a first transparent plate for closing the distal portion of the mounting, allows the use of a third immersion medium in contact with the first transparent plate and the third transparent plate, the third immersion medium not being in contact with the sample.

According to one or more exemplary embodiments, a thickness of the third plate is substantially identical to a thickness of the second plate; advantageously, the second and third plates further have dispersion curves of the refraction index with the wavelength being substantially identical, which allows the introduction of dispersion deviations and/or optical path variations to be limited if an interferometer system is used for the microscopic analysis during the change from one operating mode to another.

Thus, according to one or more exemplary embodiments, the device further comprises a third immersion medium in contact with the first transparent plate and the third transparent plate which closes the sample carrier. A third immersion medium comprises, for example, a liquid or a gel, the refraction index of which is between approximately 1.3 and approximately 1.5, that is to say, a refraction index which is generally similar to that of the sample. A third immersion medium allows the quality of the microscopic analysis to be improved if an immersion type microscope lens is used and the reflections at the interfaces to be limited.

According to one or more exemplary embodiments, the third immersion medium is identical to the first immersion medium.

According to one or more exemplary embodiments, the third immersion medium is different from the first immersion medium and has mechanical, chemical and/or physical characteristics which are different from the first immersion medium. In particular, the third immersion medium may have a third refraction index which is substantially identical to the first refraction index of the first immersion medium or may have a different refraction index. Using a third immersion medium which is different from the first immersion medium allows, for example, the selection of a third immersion medium which facilitates the change from one operating mode to the other when the first immersion medium has characteristics which make it complicated to be manipulated.

According to one or more exemplary embodiments, the third immersion medium is different from the first immersion medium and comprises a third refraction index which is substantially identical to the refraction index of a transparent overlayer of the sample to be analyzed.

According to one or more exemplary embodiments, the third immersion medium comprises a refraction index which is substantially identical to that of the sample to be analyzed.

According to one or more exemplary embodiments, the physical characteristics, refraction indices and/or dispersions are substantially identical to those of the second immersion medium in order to avoid a modification of the optical path during the change from one operating mode to another.

Alternatively, the third transmission window may comprise a simple opening in the receptacle which is formed by the sample carrier or the sample carrier may comprise only the receiving surface of the sample. In these cases, however, it is still possible to use a third immersion medium which will be in contact with the sample. Advantageously, there will be selected in this case a first end piece in the first operating mode (in vivo microscopic analysis of the skin) without any transparent closing plate in order to avoid variations of the optical path during the change from one operating mode to another.

According to one or more exemplary embodiments, the device further comprises a device which is configured for illuminating the sample and which is arranged at one end of the distal portion of the mounting. Such a device may comprise light sources, for example, light-emitting diodes, or may comprise ends of optical fibers which are configured to transport light beams. In particular, such an illumination device which is arranged at the end of the distal portion of the mounting may remain in place in both operating modes, in vivo microscopic analysis of the skin and ex vivo microscopic analysis of a sample. Such an illumination device which is arranged at the end of the distal portion of the mounting may be part of an illumination path of the sample for the microscopic analysis or may form illumination of the sample in addition to illumination of an illumination path.

According to one or more exemplary embodiments, the mounting is configured to be handheld in the first operating mode. For example, the proximal portion of the mounting comprises a handle. When using a handle, the device allows an ergonomic manual probe to be formed for the in vivo microscopic analysis of the skin.

According to one or more exemplary embodiments, the device further comprises axial displacement means for the microscope lens in the distal portion of the mounting, along the optical axis. Such displacement is particularly provided for in devices which are configured for in-depth microscopy in the sample, for example, and in a non-limiting manner, optical coherence microscopy with linear confocal filtering, or LC-OCT, with dynamic adjustment of the development of the sample, in the first operating mode comprising in vivo microscopic analysis of the skin, or in the second operating mode comprising ex vivo microscopic analysis of a sample.

According to one or more exemplary embodiments, the device further comprises axial adjustment means of the support in a direction parallel with the optical axis and/or lateral adjustment means of the support in a plane substantially perpendicular to the optical axis. In the second operating mode, the mounting comprising the distal portion in which the microscope lens is arranged and the proximal portion which is fixedly joined to the distal portion is supported by the support which is also configured to allow the alignment of the optical axis of the microscope lens as a result of the second end piece which is fixed to the distal portion of the mounting with which the support cooperates. Axial and/or lateral adjustment means of the support further allow adjustment of the position of the mounting relative to the sample carrier.

Naturally, such adjustments can be carried out alternatively or additionally with respect to the sample carrier.

Thus, according to one or more exemplary embodiments, the device further comprises lateral adjustment means of the sample carrier in a plane substantially perpendicular to the optical axis and/or axial adjustment means of the sample carrier in a direction parallel with the optical axis.

According to one or more exemplary embodiments, the support can be fixed to the mounting at other fixing locations, for example, to a handle which is arranged on the proximal portion of the mounting, in order to allow greater stability of the device in the second operating mode.

According to one or more exemplary embodiments, the second end piece comprises an external surface which is configured to cooperate with a surface of the support in order to allow alignment. The external surface may, for example, have different forms in order to allow this self-alignment. It may be, for example, conical or cylindrical.

According to one or more exemplary embodiments, the second end piece is an element with symmetry of revolution, with a central opening.

According to one or more exemplary embodiments, the device may further comprise fixing means of the second end piece with respect to the support, for example, the second end piece and the support may be magnetized in order to ensure the mechanical cooperation of the two components, allowing the alignment.

According to one or more exemplary embodiments, the device further comprises:
an emission source for an illumination path which is configured to illuminate the sample or the skin; and/or
a detector for a detection path, comprising the microscope lens, the detector being configured to detect a light beam which is emitted by the sample or the skin which is illuminated and to generate a detection signal;
the emission source and/or the detector being arranged in the proximal portion of the mounting.

According to one or more exemplary embodiments, the illumination path is configured to illuminate the sample through the microscope lens.

According to one or more exemplary embodiments, the device comprises only some of the distal elements of the illumination paths and/or detection paths, the other elements of the illumination paths and/or detection paths being offset outside the device.

Thus, in order to operate, the device may be connected to external elements, for example, and in a non-limiting manner, one or more of the following elements: illumination source, detector, electrical energy source, controllers, processing unit, for example, a computer. According to a second aspect, the present description relates to a microscopic analysis system which is configured for ex vivo microscopic analysis of a sample and in vivo microscopic analysis of the skin, comprising a device according to the first aspect. The microscopic analysis system according to the second aspect comprises:
an illumination path which is configured to illuminate the sample or the skin;
a detection path, comprising the microscope lens, the detection path being configured to detect a light beam which is emitted by the sample or the skin which is illuminated and to generate a detection signal;
a processing unit which is configured to generate a microscopic analysis information item for the sample or the skin from the detection signal.

All or some of the elements of the lighting and detection paths can be included in the device according to the first aspect.

According to one or more exemplary embodiments, the illumination path is configured to illuminate the sample through the microscope lens.

According to one or more exemplary embodiments, the analysis system according to the second aspect is configured for confocal imaging and/or optical coherence tomography imaging and the microscopic analysis information item comprises at least one image of the sample or the skin.

For example, the analysis system according to the second aspect is configured for optical coherence tomography imaging, as described in the prior art, and is configured to form B scan images, C scan images (or projected images) of the sample or in volume. In known manner, a sectional image of the sample called a "B scan" is an image which is formed in a plane parallel with the optical axis of the microscope lens; a sectional image of the sample called a "C scan" or projected image is an image which is formed in a plane perpendicular to the optical axis of the microscope lens and a 3D image of the sample or image in volume results from the acquisition of a plurality of B scan images or C scan images.

According to one or more exemplary embodiments, the analysis system according to the second aspect is configured for spectroscopic analysis and the microscopic analysis information item comprises at least one spectrum of the light beam which is emitted by the sample or the skin at least at one location of the sample or the skin.

According to a third aspect, the present description relates to a method for ex vivo microscopic analysis of a sample and in vivo microscopic analysis of the skin by means of an analysis system according to the second aspect, comprising:

fixing the first end piece to the mounting and in vivo microscopic analysis of the skin;

removing the first end piece, fixing the second end piece to the mounting and ex vivo microscopic analysis of a sample.

The method according to the third aspect may comprise at least one of the following steps, in accordance with the characteristics of the analysis system according to the second aspect, the steps being able to be combined with each other:

filling the first end piece before the fixing if a second immersion medium is being used;

positioning a third immersion medium between a first transparent plate which is configured to close the distal portion of the mounting and the sample carrier if a third immersion medium is being used.

According to one or more exemplary embodiments, the microscopic analysis of the sample or the skin comprises confocal imaging and/or optical coherence tomography imaging of the sample or the skin.

According to one or more exemplary embodiments, the microscopic analysis of the sample or the skin comprises spectroscopic analysis of the sample or the skin.

BRIEF DESCRIPTION OF THE FIGURES

Other advantages and features of the invention will be appreciated from a reading of the description which is illustrated by the following Figures:

FIG. 2B shows a drawing illustrating the first exemplary embodiment of a microscopic analysis system according to the present invention when it operates in a second operating mode, comprising an ex vivo microscopic analysis of a sample;

FIG. 3B shows a drawing illustrating the third exemplary embodiment of a microscopic analysis system according to the present invention when it operates in the second operating mode;

DETAILED DESCRIPTION OF THE INVENTION

In the following detailed description, a number of specific details are set out in order to provide a deeper understanding of the present description. However, it will appear to the person skilled in the art that the present description may be carried out without these specific details. In other cases, well-known features have not been described in detail in order to avoid complicating the description unnecessarily.

Further, in the Figures, the elements are not illustrated to scale for the sake of better visibility.

Figure 1:
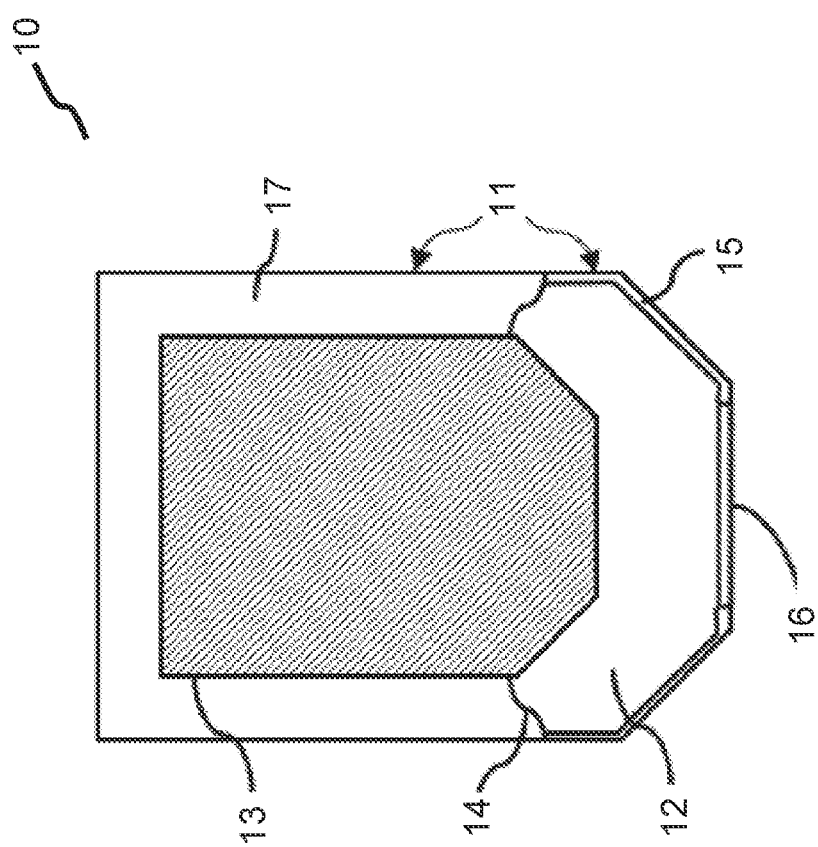
FIG. 1 which has already been described shows a drawing illustrating a fluid-tight mounting for an in vivo microscopic imaging system for the skin according to the prior art.
Figure 2A:
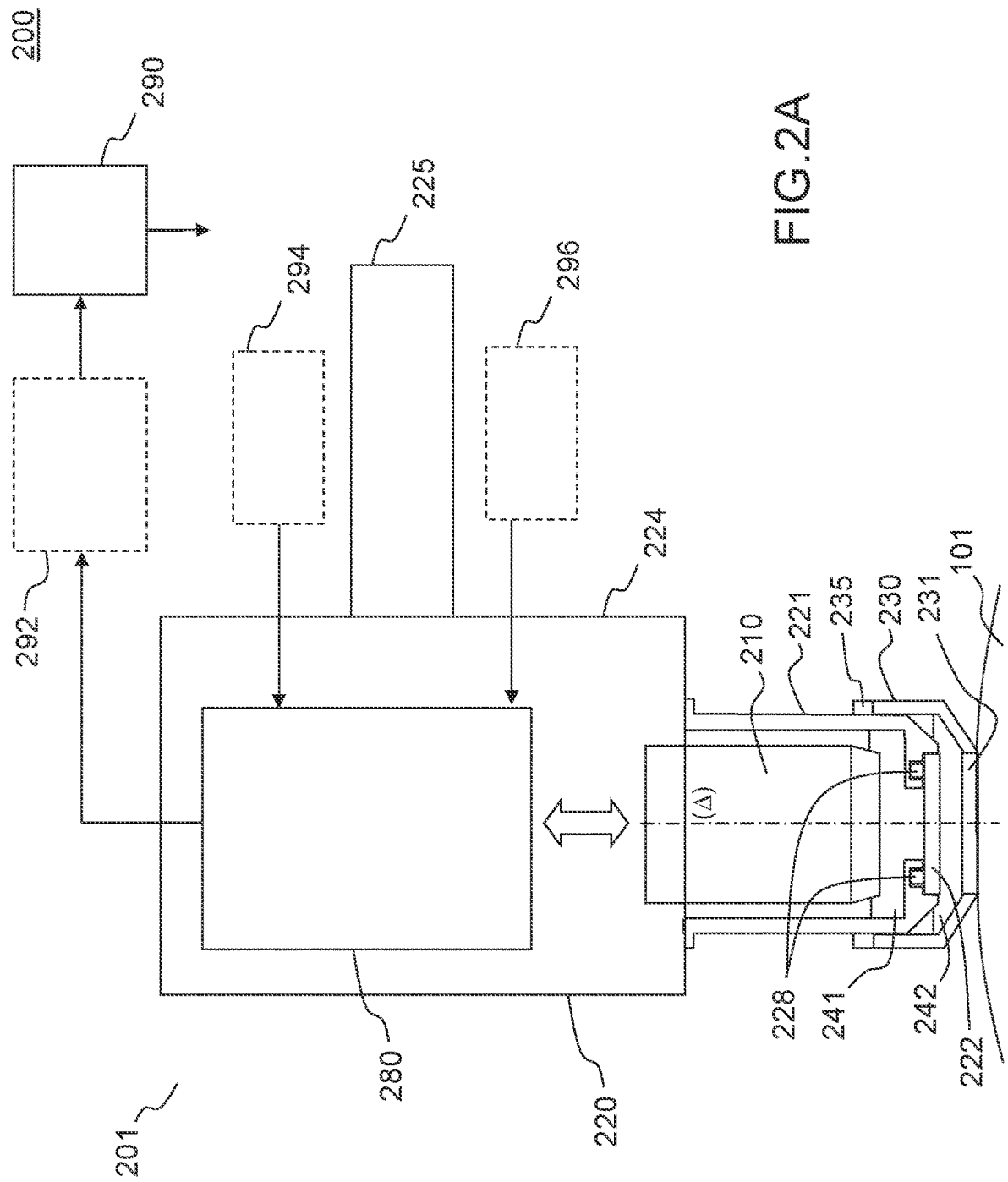
FIG. 2A shows a drawing illustrating a first exemplary embodiment of a microscopic analysis system according to the present invention when it operates in a first operating mode, comprising an in vivo microscopic analysis of the skin.

FIGS. 2A and 2B illustrate a first exemplary embodiment of a microscopic analysis system 200 according to the present description, which is configured for the ex vivo microscopic analysis of a sample and the in vivo microscopic analysis of the skin. FIG. 2A illustrates the microscopic analysis system when it operates in the first operating mode, that is to say, an in vivo microscopic analysis of the skin, and FIG. 2B illustrates the microscopic analysis system when it operates in the second operating mode, that is to say, an ex vivo microscopic analysis of a sample.

The microscopic analysis system 200 comprises a device 201 for the microscopic analysis according to the present description. The device 201 generally comprises a microscope lens 210 comprising an optical axis Δ, a mounting 220 comprising a distal portion 221, in which the microscope lens 210 is arranged, and a proximal portion 224 which is fixedly joined to the distal portion. The microscope lens may in specific exemplary embodiments be movable axially in a direction parallel with the optical axis. The proximal portion 224 generally comprises at least some of the optical elements of a detection path of the microscopic analysis system and may comprise at least some of the optical elements of an illumination path.

In the example of FIGS. 2A and 2B, at least some of the optical elements of the illumination and detection paths which are arranged within the device are designated 280. In specific exemplary embodiments, the optical elements 280 may comprise in a non-limiting manner one or other of the following elements: an illumination source, an interferometer mounting, a detector, one or more optical systems which allow optical conjugations to be ensured between image planes or pupillary planes, one or more return mirrors, one or more scanning systems, etc. The arrangement of such optical elements is known to the person skilled in the art and depends on the microscopic analysis which it is desirable to carry out.

In the exemplary embodiment of FIGS. 2A and 2B, an illumination path of the microscopic analysis system 200 which is configured to illuminate the sample 102 (FIG. 2B) or the skin 101 (FIG. 2A) through the microscope lens 210 comprises, for example, an illumination source 294, for example, a laser source, which is arranged outside the device 201. Further, a detection path of the microscopic analysis system 200 which is configured to detect a light beam which is emitted by the sample or the skin which is illuminated and to generate a detection signal and also comprising the microscope lens 210, comprises, for example, a detector 292, for example, a camera, which is also arranged outside the device 201. In the exemplary embodiment of FIGS. 2A and 2B, the microscopic analysis system 200 also comprises a processing unit 290 which is configured to generate a microscopic analysis information item of the sample or the skin from the detection signal and, optionally, one or more controllers 296 for controlling the optical elements which are arranged in the proximal portion of the device 201. The controller(s) is/are, for example, electronic boards which are configured to control an axial displacement of the microscopic objective lens 110, where necessary, or mirrors of a scanning system, etc.

The controller(s) and the source 294 may themselves be controlled by the processing unit 290.

When the analysis system 200 is configured for confocal imaging and/or optical coherence tomography imaging, the microscopic analysis information item comprises at least one image of the sample or the skin. When the analysis system 200 is configured for spectroscopic analysis, the microscopic analysis information item comprises at least one spectrum of the light beam which is emitted by the sample or the skin at least at one location of the sample or the skin.

It may be noted that, in other exemplary embodiments, the illumination source for the illumination path and/or the detector of the detection path can be integrated in the proximal portion 224 of the mounting 220 with the optical elements 280.

In other exemplary embodiments, the illumination path may not comprise the microscope lens, the illumination of the sample for the microscopic analysis being carried out directly in the region of an illumination device 228 which is arranged in the distal portion of the mounting. Such an illumination device may comprise illumination sources, for example, of the light-emitting diode type, or ends of optical fibers which are configured for transporting a lighting beam.

FIG. 2A illustrates the microscopic analysis system 200 during operation for in vivo microscopic analysis of the skin which is designated 101 in FIG. 2A.

As can be seen in FIG. 2A, the distal portion 221 of the mounting 220 comprises at one end a first transmission window which is closed by a first transparent plate 222. The device 201 further comprises a first end piece 230 which is fixed to the distal portion 221 of the mounting 220. The first end piece is mounted in a removable manner, for example, in a state positioned by means of a stop 235 which is formed in the distal portion 221 of the mounting. For example, the first end piece is screwed and the stop 235 can be formed by a counter-nut. In exemplary embodiments, the position of the stop can be adjusted with respect to the distal portion of the mounting.

In the exemplary embodiment of FIG. 2A, the first end piece 230 comprises at one end a second transmission window which is closed by a second transparent plate 231.

The device 201 also comprises a first immersion medium 241, which may be liquid or gel, in contact with the first transparent plate 222 and the microscope lens 210 and a second immersion medium 242, which may be liquid or gel, in contact with the first transparent plate 222 and the second transparent plate 231.

The original arrangement, as illustrated in FIG. 2A with the first end piece 230 fixed to the distal portion 221 of the mounting allows, in the context of use of an immersion type microscope lens 210, the immersion to be divided into two portions. In particular, the first immersion medium 241 and the second immersion medium 242 may have different characteristics, for example, mechanical, chemical and/or physical characteristics which are different, in particular refraction and/or dispersion indices.

A two-portion immersion with different immersion media may, for example, be advantageous if the microscope lens is configured to be immersed in an immersion medium 241, the characteristics of which are similar to those of the skin, but wherein the first immersion medium 241 further has characteristics (particularly mechanical or chemical characteristics) which make it complicated or dangerous for manipulation by a user of the device. A second different immersion medium 242 can thus be used, this second immersion medium having to be manipulated by the user in order to change from one operating mode to another.

A two-portion immersion with different immersion media may also be advantageous if the first immersion medium 241 has physical/chemical characteristics which make it difficult to disassemble the distal portion 221 of the mounting and the first end piece 230 in a mode for in vivo use (first immersion medium 241 too sticky, for example).

When a second immersion liquid is used, the first end piece can be fixed in a fluid-tight manner to the distal portion of the mounting, for example, by means of a sealing joint which is provided on one and/or the other of the two components.

It may be noted that the transmission window of the first end piece can also be constituted by a simple opening. It will nevertheless be possible to use a microscope lens 210 which is configured to operate with immersion as a result of the vessel formed by the distal portion 221 of the mounting which is closed by the plate 222. In this case, the immersion medium of the skin will be air. As illustrated in FIG. 2A, the distal portion 221 of the mounting may also incorporate elements which are useful for the operation of the system and which need to be close to the skin or the sample to be analyzed, such as, for example, an illumination device 228. The illumination device 228 can remain in place during the change in the operating mode for ex vivo microscopic analysis (FIG. 2B).

FIG. 2B illustrates the microscopic analysis system 200 when it operates in a second operating mode, that is to say, ex vivo microscopic analysis of a sample, which is designated 102 in FIG. 2B.

As can be seen in FIG. 2B, the device 201 comprises, for this operating mode, a second end piece 250 which is fixed to the distal portion 221 of the mounting 220 in place of the first end piece 230 (FIG. 2A). In this exemplary embodiment, the second end piece is a component with symmetry of revolution which comprises a central opening. The second end piece 250 is, for example, positioned by means of the stop 235. For example, the second end piece is screwed and the stop 235 can be formed by a counter-nut.

The device 201 further comprises a sample carrier 260 comprising a receiving surface 263 which is configured to receive the sample 102 and a support 270. The support 270 cooperates with the second end piece 250 so as to receive the mounting 220 in such a manner that the optical axis of the microscope lens is substantially aligned with a predetermined direction with respect to the receiving surface, for example, a direction which is substantially perpendicular to the receiving surface. More specifically in this exemplary embodiment, the alignment of the optical axis is obtained by causing an external surface of the second end piece 250 to cooperate with a surface of the support 270. In this exemplary embodiment, the forms of the surfaces which cooperate are conical.

In exemplary embodiments (not illustrated in the Figures), the device may comprise a fine adjustment system for the alignment of the optical axis of the microscope lens in order to refine the adjustment after the self-alignment which is obtained as a result of the cooperation of the second end piece 250 and the support 270.

For example, as illustrated in FIG. 2B, the device 201 further comprises (optional) axial adjustment means 275 of the support 270 in a direction parallel with the optical axis Δ and/or lateral adjustment means of the support in a plane substantially perpendicular to the optical axis. The device may also comprise (optional) lateral adjustment means 265 of the sample carrier in a plane substantially perpendicular to the optical axis and/or axial adjustment means of the sample carrier in a direction parallel with the optical axis. These adjustment means are intended, during operation, to adjust the relative position of the microscope lens 210 and the sample. In particular, the axial adjustment allows it to be ensured that the portion of the sample, for which it is desirable to carry out the microscopic analysis, is positioned at the required working distance from the microscope lens.

In the exemplary embodiment of FIG. 2B, the adjustment means 265 and 275 are fixedly joined to the same platform 20 which may or may not be part of the device 201.

The adjustment means 265 and/or 275 may themselves be controlled by the processing unit 290.

In general, the support 270 can be configured to support the mounting 220 simply by means of the second end piece 250. However, in order to reinforce the stability of the device, during operation, it is possible to provide other fixing locations for the support 270 with the mounting 220. Thus, for example, once the mounting 220 is positioned on the support 270, it will be possible to fix the support 270 to the handle 225 of the device 201, as schematically shown with broken lines in FIG. 2B.

As illustrated in FIG. 2B, the sample carrier 260 comprises a receptacle with a third transmission window which is closed by a third transparent plate 262. The third transparent plate is, for example, arranged in a cover 261 of the sample carrier. For example, a thickness of the third transparent plate 262 is substantially identical to a thickness of the second transparent plate 231. With substantially identical plate thicknesses, the effects of deviations of dispersion and variations of the optical path are limited when changing from one operating mode to the other, particularly if the microscopic analysis uses an interferometer system.

The third transparent plate 262 allows the sample to be pressed in the sample carrier, thereby allowing better repeatability of the microscopic analysis. On the other hand, as illustrated in FIG. 2B, the third transparent plate 262, in conjunction with the use of the first transparent plate 222 for closing the distal portion 221 of the mounting, allows the use of a third immersion medium 243 in contact with the first transparent plate 222 and the third transparent plate 262 without the third immersion medium 243 being in contact with the sample 102, which can be found to be disruptive.

The third immersion medium 243 comprises, for example, a liquid or a gel, the refraction index of which is between approximately 1.3 and approximately 1.5, that is to say, a refraction index which is generally similar to that of the sample. The third immersion medium 243 allows an improvement of the quality of the microscopic analysis if an immersion type microscope lens is used and allows the reflections at the interfaces to be limited.

The third immersion medium can be identical to the first immersion medium 241 or may have mechanical, chemical and/or physical characteristics which are different from the first immersion medium. In particular, the third immersion medium may have a third refraction index which is substantially identical to the first refraction index of the first immersion medium or may have a different refraction index. In the ex vivo microscopic analysis operating mode, as illustrated in FIG. 2B, with different immersion media 241, 243 may be advantageous if the first immersion medium 241 has physical/chemical characteristics which make it difficult to disassemble the distal portion 221 of the mounting and the sample carrier 260, for example, because the first immersion medium 241 is too sticky.

A two-portion immersion with different immersion media 241, 243 is also advantageous if the first immersion medium 241 has characteristics which make it difficult to interface the distal portion of the mounting with the sample carrier 260, for example, as a result of insufficient surface tension to place a drop which will be maintained in order to comply with an adequate working distance.

It may further be the case that some samples, for which it is desirable to carry out a microscopic analysis, are packaged with an overlayer of a transparent medium which may be different from the first immersion medium 241 and which may have a variable thickness. In this case, it is possible to use a third immersion medium, the physical characteristics of which, for example, refraction index and/or dispersion index, are substantially identical to the medium of the overlayer, and to adapt the thickness of the third immersion medium to the thickness of the overlayer in order to limit the variation of the optical path during the change from one operating mode to another. This is particularly important when the microscopic analysis system comprises an interferometer with a fixed reference arm, for example.

In the exemplary embodiment of FIG. 2B, the alignment of the optical axis is obtained by making a conical external surface of the second end piece 250 cooperate with a conical surface of the support 270.

Figure 2C:
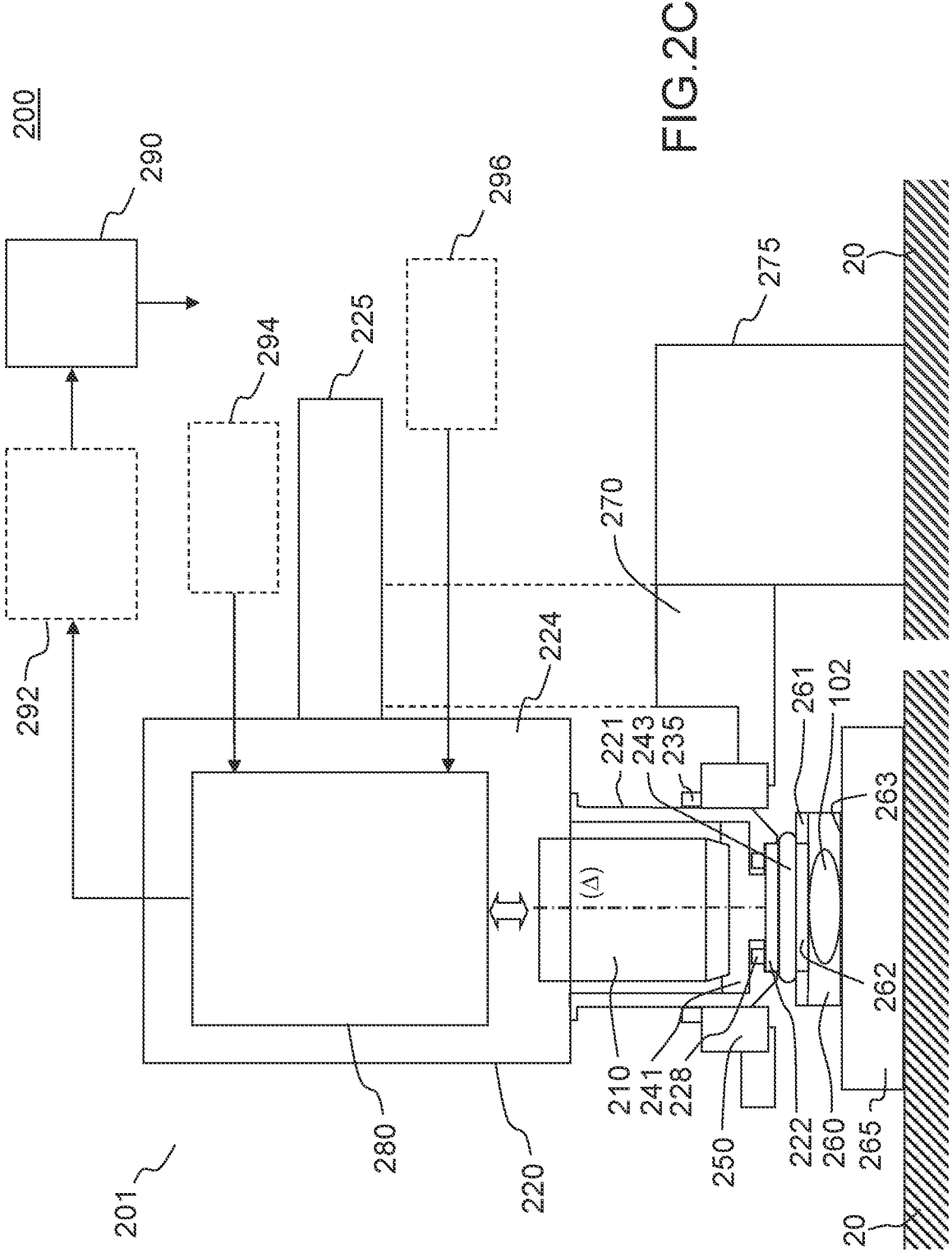
FIG. 2C shows a drawing illustrating a second exemplary embodiment of a microscopic analysis system according to the present invention when it operates in the second operating mode.

FIG. 2C shows another exemplary embodiment in which a cylindrical external surface of the second end piece 250 cooperates with a cylindrical surface of the support 270. Naturally, other exemplary embodiments may be envisaged by the person skilled in the art in order to obtain self-alignment of the optical axis as a result of the cooperation of the second end piece 250 and the support 270, and in particular in order to make an external surface of the second end piece 250 cooperate with a surface of the support 270 so as to allow the alignment of the optical axis of the microscope lens 210 in a predetermined direction with respect to the receiving surface 263. Thus, for example, a surface may be provided with a rolling system (for example, balls) which is/are configured to be received in grooves of the other surface or any other means which is known to the person skilled in the art.

In addition, the device may further comprise fixing means for the second end piece with respect to the support, which means are not illustrated in FIGS. 2B, 2C, for example, the second end piece and the support can be magnetized in order to ensure the mechanical cooperation of the two components, allowing the alignment.

Figure 3A:
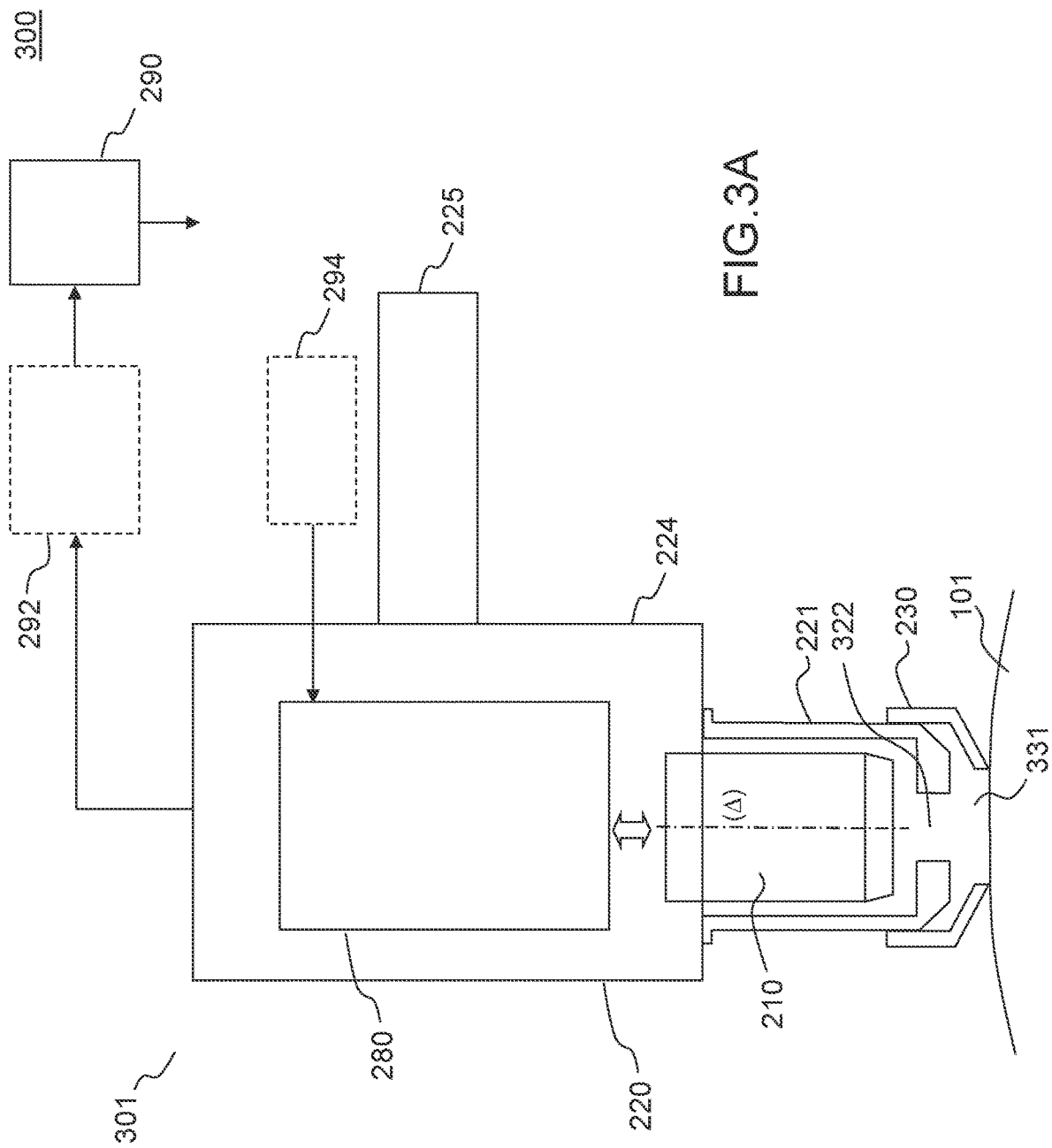
FIG. 3A shows a drawing illustrating a third exemplary embodiment of a microscopic analysis system according to the present invention when it operates in the first operating mode.

FIGS. 3A and 3B illustrate a second exemplary embodiment of a microscopic analysis system 200 according to the present description which is configured for ex vivo microscopic analysis of a sample and in vivo microscopic analysis of the skin. FIG. 3A illustrates the microscopic analysis system in a first operating mode for in vivo microscopic analysis of the skin and FIG. 3B illustrates the microscopic analysis system in a second operating mode for ex vivo microscopic analysis of a sample.

The elements of FIGS. 3A and 3B which are similar to those of FIGS. 2A and 2B are referred to in an identical manner and are not described again.

As can be seen in FIG. 3A, in this exemplary embodiment and unlike FIG. 2A, the distal portion 221 of the mounting 220 comprises a transmission window which is formed by a simple opening 322. In the same manner, the first end piece 230 comprises a transmission window which is constituted by a simple opening 331. Thus, in this exemplary embodiment, the microscope lens and the skin are immersed in air. In this exemplary embodiment, the distal portion 221 allows protection of the microscope lens 210, particularly during the change from the first operating mode for in vivo microscopic analysis to the second operating mode for ex vivo microscopic analysis, during which change an operator removes the first end piece in order to position the second end piece (250, FIG. 3B). Further, the distal portion 221 can incorporate an illumination device, as described previously with reference to FIGS. 2A to 2C.

Further, as can be seen in FIG. 3B, the sample carrier 260 may also not be closed by a transparent plate.

Figure 4:
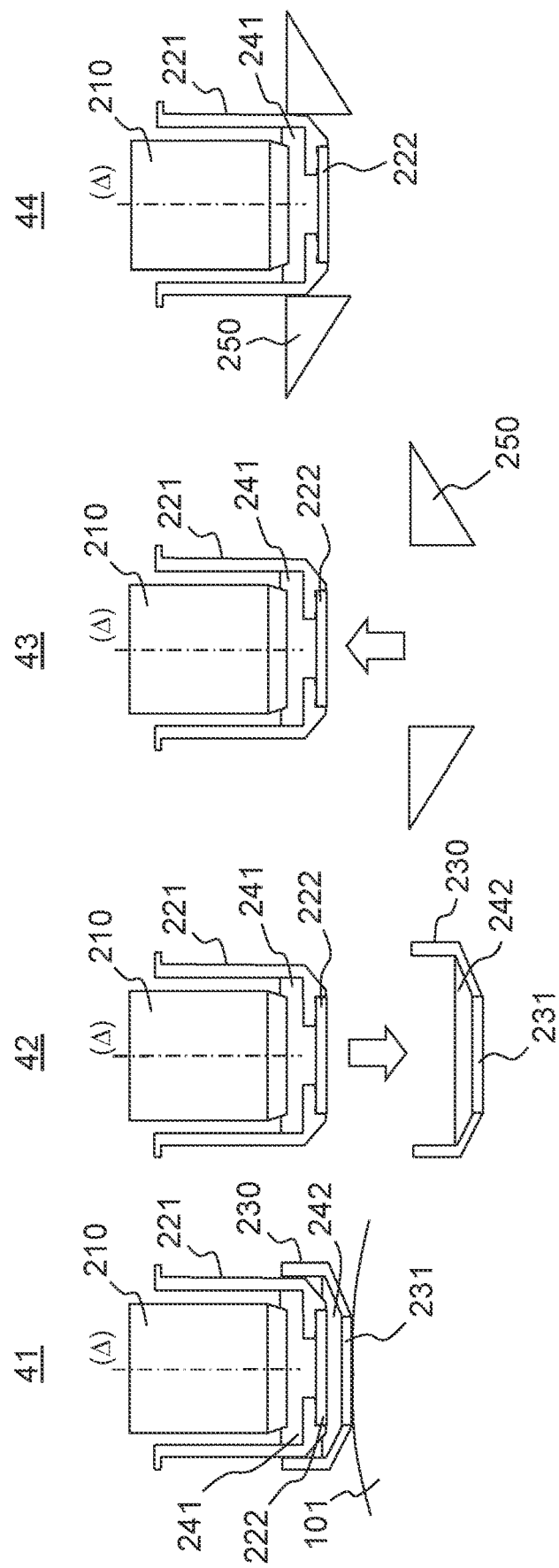
FIG. 4 shows drawings illustrating steps of a method for in vivo microscopic analysis of the skin and ex vivo analysis of a sample by means of an analysis system according to the present description.

FIG. 4 illustrates drawings which illustrate steps of an in vivo microscopic analysis method for the skin and an ex vivo microscopic analysis method for a sample by means of an analysis system according to the present description. FIG. 4 illustrates only the distal portion of the device. Further, the device which is illustrated is the one illustrated in FIGS. 2A, 2B, but naturally the method illustrated with reference to FIG. 4 can be applied to other exemplary embodiments. As illustrated in FIG. 4, the microscopic analysis method comprises fixing 41 the first end piece 230 to the mounting 220 and an in vivo microscopic analysis of the skin, then removing 42 the first end piece 230 and fixing (steps 43, 44) the second end piece 250 to the mounting 220. The device with the second end piece 250 can thus be mounted on the support (270, FIG. 2B) in order to carry out the ex vivo microscopic analysis of a sample. The device can subsequently again by used for the in vivo microscopic analysis of the skin by removing the second end piece and replacing it with a first end piece. It may be noted that, in practice, the first end piece can be a consumable item which will be changed for each new in vivo use.

FIG. 4 illustrates how, as a result of the device according to the present description, a self-alignment of the optical axis of the microscope lens can be obtained during the change from the first operating mode for in vivo microscopic analysis to the second operating mode for ex vivo microscopic analysis.

FIG. 4 also shows an advantage of the presence of the first end piece 230 which is fixed to the distal portion 221 of the mounting. This is because, as a result of the presence of the distal portion, during the removal of the first end piece in order to fix the second end piece 250, the microscope lens 210 is protected.

Further, in the case of an immersion type microscope lens 210, as illustrated in FIG. 4, the fluid-tightness is ensured as a result of the distal portion 221 of the mounting which is closed by the transparent window 222 and which remains in place during the removal of the first end piece 230 in order to position the second end piece 250.

For the in vivo microscopic analysis of the skin, the first end piece 230 is used as a "plug" which it is simply necessary to fill with the second immersion medium 242, which may be liquid or gel. The first end piece can be fixed in a fluid-tight manner to the distal portion of the mounting.

For the ex vivo microscopic analysis of a sample, a third immersion liquid (not illustrated in FIG. 4) can be arranged between the sample carrier and the transparent plate 222.

For example, for samples which are packaged with an overlayer of a transparent medium which is different from the first immersion medium 24, it will be possible to select a third immersion medium, of which the physical characteristics, for example, refraction index and/or dispersion index, are substantially identical to the medium of the overlayer, and to adapt the thickness of the third immersion medium to the thickness of the overlayer in order to limit the variation of the optical path during the change from one operating mode to another.

Although described using a specific number of exemplary embodiments, the devices and methods according to the present description comprise different variants, modifications and improvements which will appear in an evident manner to the person skilled in the art, it being understood that these different variants, modification and improvements form part of the scope of the invention as defined by the appended claims.

REFERENCES

Ref. 1: M. Rajadhyaksha et al., «*In vivo confocal scanning laser microscopy of human skin II. Advances in instrumentation and comparison with histology*», J Invest Dermatol, 1999.

Ref 2: K. König et al., "*High-resolution multiphoton tomography of human skin with subcellular spatial resolution and picosecond time resolution,*" J. Biomed. Opt. 8, 432-439 (2003).

Ref 3: Schmitt et al., "*Subsurface Imaging of Living Skin with Optical Coherence Microscopy*", Dermatology 1995; 191:93-98.

Ref. 4: Published patent application WO2015092019.

Ref 5: Y. Chen et al., «*High-resolution line-scanning optical coherence microscopy*", Optics Letters, Vol. 32, No 14, 1971-1973 (2007).

Ref 6: J. Schleusener et al., "*Raman spectroscopy for the discrimination of cancerous and normal skin*", Photon Lasers Med (2015).

Ref 7: E. Drakaki et al., "*Spectroscopic methods for the photodiagnosis of nonmelanoma skin cancer*", Journal of Biomedical Optics 18(6), 061221 (June 2013).

Ref 8: Published patent application WO2019138062.

Ref. 9: EP 3 018 518

Ref. 10: WO 2016/083003

Ref. 11: DE 10 2009 044 413

Ref. 12: U.S. Pat. No. 10,514,532

The invention claimed is:

1. A device which is configured to operate in a first operating mode comprising an in vivo microscopic analysis of a skin and in a second operating mode comprising ex vivo microscopic analysis of a sample, the device comprising:
    a microscope lens comprising an optical axis;
    a mounting comprising a distal portion, in which the microscope lens is arranged, and a proximal portion which is fixedly joined to the distal portion, the distal portion comprising at one end a first transmission window;
    a first end piece which comprises at one end a second transmission window and which is configured to be fixed in a removable manner, in the first operating mode, to the distal portion of the mounting;
    a second end piece which is configured to be fixed in a removable manner, in the second operating mode, to the distal portion of the mounting;
    a sample carrier comprising a receiving surface which is configured to receive a sample in the second operating mode;
    a support which is configured to cooperate with the second end piece in the second operating mode so as to receive the mounting so that the optical axis of the microscope lens is substantially aligned in a predetermined direction with respect to the receiving surface.

2. The device as claimed in claim 1, wherein the first transmission window comprises a first transparent plate which closes an end of the distal portion of the mounting.

3. The device as claimed in claim 2, further comprising a first immersion medium in contact with the first transparent plate and the microscope lens.

4. The device as claimed in claim 1, wherein the second transmission window comprises a second transparent plate which closes an end of the first end piece.

5. The device as claimed in claim 4, wherein
the first transmission window comprises a first transparent plate which closes an end of the distal portion of the mounting; and
the device further comprises a second immersion medium in contact with the first transparent plate and the second transparent plate.

6. The device as claimed in claim 1, wherein the sample carrier comprises a third transparent plate which closes the sample carrier.

7. The device as claimed in claim 6, wherein
the first transmission window comprises a first transparent plate which closes an end of the distal portion of the mounting; and
the device further comprises a third immersion medium in contact with the first transparent plate and the third transparent plate.

8. The device as claimed in claim 1, further comprising a device which is configured for illuminating the sample and which is arranged at one end of the distal portion of the mounting.

9. The device as claimed in claim 1, wherein the mounting is configured to be handheld in the first operating mode.

10. The device as claimed in claim 1, further comprising axial displacement means for the microscope lens in the distal portion of the mounting, along the optical axis.

11. The device as claimed in claim 1, further comprising axial adjustment means of the support in a direction parallel with the optical axis and/or lateral adjustment means of the support in a plane substantially perpendicular to the optical axis.

12. The device as claimed in claim 1, further comprising lateral adjustment means of the sample carrier in a plane substantially perpendicular to the optical axis and/or axial adjustment means of the sample carrier in a direction parallel with the optical axis.

13. The device as claimed in claim 1, wherein the second end piece comprises an external surface which is configured to cooperate with a surface of the support in order to allow the alignment.

14. A microscopic analysis system which is configured to operate in a first operating mode comprising in vivo microscopic analysis of a skin and in a second operating mode comprising ex vivo microscopic analysis of a sample, the system comprising:
a device as claimed in claim 1;
an illumination path which is configured to illuminate the sample or the skin;
a detection path comprising the microscope lens, the detection path being configured to detect a light beam which is emitted by the sample or the skin which is illuminated and to generate a detection signal;
a processing unit which is configured to generate a microscopic analysis information item for the sample or the skin from the detection signal; and wherein
all or some of elements of the lighting and detection paths are included in the device.

15. The analysis system as claimed in claim 14, which is configured for confocal imaging and/or optical coherence tomography imaging, wherein the microscopic analysis information item comprises at least one image of the sample or the skin.

16. The analysis system as claimed in claim 14, which is configured for spectroscopic analysis, wherein the microscopic analysis information item comprises at least one spectrum of the light beam which is emitted by the sample or the skin at least at one location of the sample or the skin.

17. A method for ex vivo microscopic analysis of a sample and in vivo microscopic analysis of a skin by means of an analysis system as claimed in claim 14, comprising:
removing the second end piece, fixing the first end piece to the mounting and doing an in vivo microscopic analysis of the skin;
removing the first end piece, fixing the second end piece to the mounting and doing an ex vivo microscopic analysis of a sample.

18. The method for analysis of a sample as claimed in claim 17, wherein the microscopic analysis of the sample or the skin comprises confocal imaging and/or optical coherence tomography imaging of the sample or the skin.

19. The method for analysis of a sample as claimed in claim 17, wherein the microscopic analysis of the sample or the skin comprises spectroscopic analysis of the sample or the skin.

* * * * *